though there is the possibility of using no acid binding agent whatever, when the compound is formed as its acid addition salt and must be liberated in known manner to give the tertiary amino ether desired.

United States Patent Office 2,895,995
Patented July 21, 1959

2,895,995

QUATERNARY AMMONIUM SALTS OF DIALKYL-AMINOALKYL PHENYL ETHERS

George Lawrence Willey, Salisbury, England, and Peter Hey, Baghdad, Iraq

No Drawing. Continuation of application Serial No. 455,764, September 13, 1954. This application April 10, 1957, Serial No. 651,824

3 Claims. (Cl. 260—567.6)

This invention relates to novel quaternary ammonium salts of dialkylaminoalkyl phenyl ethers and, more particularly, this invention relates to the quaternary ammonium salts of dialkylaminoalkyl disubstituted-phenyl ethers possessing valuable pharmacological activity.

This application is a continuation of our application Serial No. 455,764, filed September 13, 1954, now abandoned.

The new compounds of the invention are of pharmacological value in that they are potent local anaesthetics, possessing the specific advantage of prolonged duration of action coupled with low toxicity. The said advantages could not have been predicted a priori from the chemical structure of the compounds in question. Extensive research and biological experimentation have shown that changes in structure, which might otherwise be regarded as insignificant, either drastically reduce or even eliminate potency.

According to the present invention, the quaternary ammonium salts of dialkylaminoalkyl disubstituted-phenyl ethers are represented by the following general formula:

FORMULA I

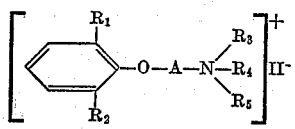

when:

$R_1$ and $R_2$ are methyl or chloro, A is —$CH_2$—$CH_2$—, $$-CH-CH_2-\text{ or }-CH_2-CH-$$
$$\phantom{-}|\phantom{-CH_2-}\phantom{or}\phantom{-CH_2-}|$$
$$\phantom{-}CH_3\phantom{-CH_2-or-CH_2-}CH_3$$

$R_3$, $R_4$, and $R_5$ are methyl or ethyl.

The nature of the anion II⁻ is not critical but, as will be understood, it should not be derived from an acid yielding a pharmacologically disadvantageous anion; that is to say II⁻ is a non-toxic anion, typical examples being halide, such as chloride or bromide, bitartarate, citrate, methosulphate, and neutral sulphate ions.

The quaternary salts of this invention, designated by Formula I, are prepared advantageously from the bases by direct quaternation. The basic starting materials are prepared by several methods, for instance by reacting a compound of the general formula:

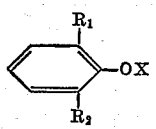

with a compound of the general formula:

$$Y-Z$$

where X, Y, and Z represent atoms or atom groups, such that X will react with Y—Z to form the tertiary amino grouping

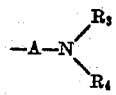

or a corresponding acid salt or quaternary ammonium salt grouping or a group readily convertible into one of these three groupings and, in the latter case, thereafter converting the group obtained into the tertiary amino grouping

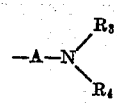

or a corresponding acid salt or quaternary ammonium salt grouping.

Groups which are convertible into the grouping

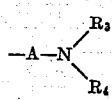

include —A—$NH_2$ and —A—$NHR_3$ (both convertible by alkylation), —A—Hlg, where Hlg represents a halogen atom, e.g., bromine (convertible by treatment with an amine

and, applicable in certain cases only—A′,

(convertible by reduction). The grouping A′ represents a grouping differing from a grouping A of the type containing a terminal —$CH_2$— grouping, only in the omission of the terminal —$CH_2$— grouping. Groups which may be converted into acid salt groups, or quarternary ammonium salt groups, corresponding to the tertiary amino grouping

include A—$NH_2$ and —A—$NHR_3$ (both convertible by alkylation followed, when the quaternary ammonium salt is required by quaternation).

A preferred process for preparing tertiary amino ethers corresponding to the quaternary ammonium compounds of the general Formula I comprises reacting the corresponding phenol of the general formula:

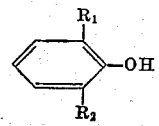

(wherein $R_1$ and $R_2$ each have the significance hereinbefore set forth) with a dialkylaminoalkyl halide, preferably the chloride, of the general formula:

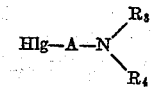

(wherein A, $R_3$, $R_4$, and Hlg each have the significance hereinbefore set forth), the reaction being preferably effected in the presence of an acid binding agent which may be inorganic in character (for example, potassium carbonate) or organic in character (for example, pyridine or dimethylaniline). The acid binding agent is unnecessary if the phenol is in the form of an alkali metal derivative thereof.

Specific alternative methods for preparing the new ethers corresponding to the quaternary ammonium compounds of the general Formula I are as follows:

By reaction of an ester of the general formula:

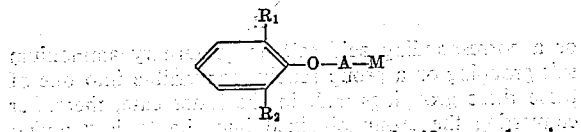

(wherein $R_1$ and $R_2$ each have the significance hereinbefore set forth and M represents an ester radical) with a secondary amine of the type

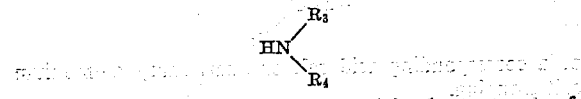

the reaction being preferably effected in the presence of an acid binding agent of organic or inorganic character such as pyridine or potassium carbonate.

In the case of compounds in which A represents a grouping containing a terminal —$CH_2$— grouping attached to the adjacent nitrogen atom, by the reduction of a corresponding amide of the general formula:

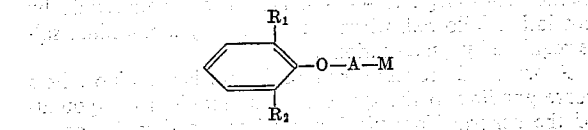

(wherein $R_1$, $R_2$, $R_3$, and $R_4$ each have the significance hereinbefore set forth and A' is a divalent group differing from A only in the omission of said terminal —$CH_2$— grouping), the reduction being preferably effected by means of molecular hydrogen in the presence of a precious metal catalyst or by means of chemical reducing agents such as lithium aluminum hydride.

Alternatively, the esters may be prepared by the alkylation of a corresponding primary amine or of a corresponding secondary amine (containing the substituent $R_3$) with an alkyl ester of the type $R_4M$ (wherein $R_4$ and M each have the significance hereinbefore set forth) the reaction being preferably effected in the presence of an acid binding agent in the form of an organic or inorganic base.

A preferred method for producing quaternary ammonium salts of general Formula I comprises reacting a compound of the general formula:

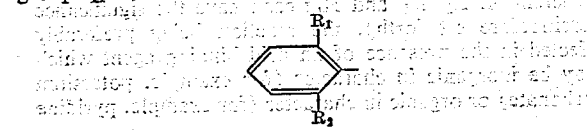

(wherein the symbols each have the significance hereinbefore set forth) with the appropriate tertiary amine and, if the anion M of the quaternary salt so formed is not that required in the final product, subsequently converting the salt so formed into the required product, e.g. directly by metathesis or through the corresponding hydroxide. An alternative route consists in treating an ether of general Formula I with a quaternating agent.

Those of the starting materials required for the various processes hereinbefore described that are not known substances may be made by the application of methods known for the production of compounds of similar type. (In the following description, the symbol Ar denotes the grouping:

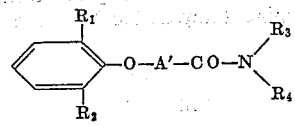

and the other symbols referred to are as hereinbefore defined.) Thus, for example, primary amines of the type Ar—O—A—$NH_2$ and secondary amines of the type Ar—O—A—$NHR_3$ may be produced by reaction of the appropriate ester and phenol, e.g.:

Ar·OH + M—A—$NHR_3$ → Ar—O—A—$NHR_3$ preferably in the presence of an organic or inorganic base; compounds of the type Ar—O—A—M may be prepared by reaction of the appropriate phenol with an appropriate diester, thus:

Ar·OH + M—A—M → Ar—O—A—M preferably in the presence of an organic or inorganic base; and compounds of the type

may be prepared by reaction of the appropriate phenol with an amide ester of the type

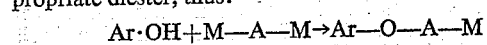

It will be appreciated that when the grouping A is either —$CH_2CH(CH_3)$— or —$CH(CH_3)·CH_2$— isomerisation can occur at one stage or another of one of the aforesaid processes with the simultaneous production of both isomers. These isomers can, however, readily be separated. For example, a mixture of isomeric ether bases may be converted into hydrochlorides, the hydrochloride mixture fractionally crystallised from a suitable solvent, such as acetone, and, if the free ether bases are required, treating the individual isomers thus separated with caustic alkali.

The invention is illustrated by the following examples:

Example I

2:6-dichlorophenol (27.7 gm.; 0.17 mol) is added to a solution of potassium hydroxide 85% (13 gm.; 0.20 mol) in water (3 ml.) and ethanol (60 ml.) and the resulting mixture is refluxed for one hour on the steam bath with β-dimethylaminoethyl chloride hydrochloride (15.0 gm.; 0.1 mol). The mixture is then cooled, the precipitated potassium chloride is removed by filtration and the filtrate and washings are concentrated in vacuo. The residual oil is taken up in 2 N hydrochloric acid (50 ml.) and unchanged dichlorophenol is extracted with ether. Excess solid potassium carbonate is added to the aqueous acid solution, the precipitated base is extracted with ether and the ethereal solution is dried with potassium carbonate. Dry hydrogen chloride is then passed in until the mixture is just permanently acid to Congo red. The precipitated salt is filtered off and washed with ether to give 2-(β-dimethylaminoethoxy)-1,3-dichlorobenzene hydrochloride (11.2 g.), M.P. 165–169° C. which, after recrystallisation from a mixture of alcohol, acetone and ether, melts at 169–170° C. The base obtained as described above is treated with a quaternating agent to form the desired quaternary ammonium salt.

Example II

Sodium (1.38 gm.; 0.06 mol) is dissolved in methanol, 2:6-dichlorophenol (9.9 gm.; 0.06 mol) is added, the solution is evaporated to dryness and the solid residue is dissolved in acetone (50 ml.). To a solution of β-diethylaminoethyl chloride hydrochloride (10.5 gm.; 0.06 mol) in water (6.0 ml.) is added first ether and then an excess of solid potassium carbonate (15 gm.) with cooling. The ethereal solution and ether rinsings are decanted from the stiff paste into the above acetone solution. The ether is then boiled off until the temperature of the reaction mixture is 55° C. and the mixture is then refluxed for four hours. The mixture is then cooled, the precipitated sodium chloride is removed by filtration and, proceeding as described in Example I, 2-(β-diethylaminoethoxy)1:3-dichlorobenzene hydrochloride (14.5 gm.), M.P. 115–117° C., is obtained which, after recrystallisation free acetone-ether, melts at 117–118° C. The base is treated with a quaternating agent to obtain the desired quaternary ammonium salt.

Example III

Proceeding as described in Example II but commencing with sodium (3.45 gm.; 0.15 mol), 2:6-xylenol (18.3 gm.; 0.15 mol) and 3-dimethylamino-2-chloropropane hydrochloride (24 gm.; 0.15 mol) a crude hydrochloride (31 gm.) M.P. 146–170° C. is obtained from which 2-(2′-dimethylamino-1′-methylethoxy)1:3-dimethylbenzene hydrochloride, M.P. 159–160° C. is obtained by fractional crystallisation from acetone. The base of the hydrochloride is then treated with a quaternating agent.

Example IV

Proceeding as described in Example II but commencing with sodium (2.8 gm.; 0.122 mol), 2:6-xylenol, (16.5 gm.; 0.135 mol) and 3-diethylamino-2-chloropropane hydrochloride (22.4 gm.; 0.12 mol), a mixture of hydrochlorides (33 gm.), M.P. 110–149° C. is obtained which, on fractional crystallisation from acetone, yields 2-(2′-diethylamino-2′-methylethoxy) - 1:3-dimethylbenzene hydrochloride (11.8 gm.), M.P. 161–162° C. and 2-(2′-diethylamino-1′-methylethoxy) - 1:3 - dimethylbenzene hydrochloride (12.6 gm.), M.P. 115–121° C., which, on recrystallisation from a mixture of alcohol, acetone, and ether, melts at 120–121° C. The bases therefrom are then each treated with a quarternating agent to form the desired quaternary ammonium salt.

Example V

The following compounds can be prepared in manner similar to that described in any of the preceding examples or by allowing the corresponding aryloxy ethyl bromide to react in a sealed ampoule at room temperature with an excess of an ethereal solution of dimethylamine or diethylamine.

(a) β-(2:6-xylyloxy)ethyldimethylamine. Liquid, B.P. 124° C./10 mm.

The hydrobromide crystallised from methanol in needles M.P. 166° C.

(b) β-(2:6-xylyloxy)ethyldiethylamine. Liquid B.P. 131° C./10 mm.

The hydrobromide crystallised from methanol in needles M.P. 151° C. The quarternary salts are then prepared by treating the bases with a quaternating agent.

Example VI

2:6-xylenol (24.4 gm.; 0.2 mol) is dissolved in 1:2-dibromoethane (112 gm.; 0.6 mol) and ethanol (100 ml.). The mixture is heated to reflux and stirred, and a solution of sodium hydroxide (12 gm.; 0.3 mol) in water is added during three hours and heating and stirring continued for a further twelve hours. Dilution of the reaction mixture with water permits the separation of an organic layer which, on distillation, yields about 30 gm. of β-(2:6-xylyloxy)-ethyl bromide B.P. 138–139° C. at 16 mm. pressure, which is a colorless liquid having $[n]_D^{20°}$ 1.5391. The β-(2:6-xylyloxy)-ethyl bromide (22.9 gm.; 0.1 mol) and trimethylamine (9 gm.; 0.15 mol), dissolved in acetone (9 ml.) are enclosed in a sealed vessel and allowed to stand at room temperature for forty-eight hours. About 30 gm. of β-(2:6-xylyloxy)-ethyltrimethyl-ammonium bromide crystallises out and may be purified by crystallisation from organic solvents such as ethanol-acetone mixtures or from concentrated aqueous hydrobromic acid. The product is a white crystalline solid of M.P. 209° C., readily soluble in cold water, methanol and ethanol, slightly soluble in acetone and insoluble in diethyl ether.

Example VII

Proceeding as described in Example VI but using triethylamine in place of trimethylamine, there is obtained β-(2:6-xylyloxy)-ethyltriethylammonium bromide, a white crytsalline solid melting at 181° C.

We claim:

1. A quaternary ammonium salt of an amino phenyl ether of the formula:

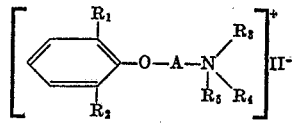

wherein $R_1$ and $R_2$ are each selected from the group consisting of chlorine and methyl; A represents a divalent group selected from the group consisting of —CH$_2$—CH$_2$—,

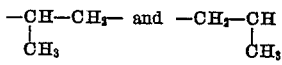

$R_3$, $R_4$, and $R_5$ are selected from the group consisting of methyl and ethyl; and II⁻ is a non-toxic anion.

2. A quaternary ammonium salt of an amino phenyl ether of the formula:

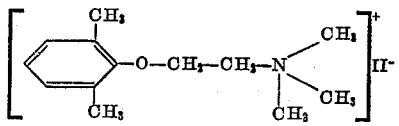

wherein II⁻ is a non-toxic anion.

3. β-(2:6-xylyloxy) ethyltrimethylammonium bromide.

References Cited in the file of this patent

Goldfarb: J.A.C.S., 63, p. 2280 (1941).
Schmid et al.: Helv. Chim. Acta, vol. 36, p. 489 (1953).
Hey: Brit. J. Pharmacol. vol. 7, pp. 117–29 (1952) as abstracted in vol. 47, Chem. Abst., p. 1639 (1953).
Suter et al.: Liebigs Ann., vol. 576, p. 223 (1952).
Jones: Biochem. J., vol. 45, pp. 143–9 (1949).